United States Patent
Schlittenbauer et al.

(10) Patent No.: US 9,751,406 B2
(45) Date of Patent: Sep. 5, 2017

(54) MOTOR VEHICLE AND METHOD FOR CONTROLLING A CLIMATE CONTROL SYSTEM IN A MOTOR VEHICLE

(71) Applicant: AUDI AG, Ingolstadt (DE)

(72) Inventors: Michael Schlittenbauer, Ingolstadt (DE); Marcus Kuehne, Ingolstadt (DE); Ulrich Mueller, Ingolstadt (DE); Megan McClain, San Francisco, CA (US); Nathaniel Paffett-Lugassy, San Francisco, CA (US)

(73) Assignee: AUDI AG, Ingolstadt (DE)

( * ) Notice: Subject to any disclaimer, the term of this patent is extended or adjusted under 35 U.S.C. 154(b) by 130 days.

(21) Appl. No.: 14/678,453

(22) Filed: Apr. 3, 2015

(65) Prior Publication Data

US 2015/0283904 A1    Oct. 8, 2015

Related U.S. Application Data

(60) Provisional application No. 61/974,727, filed on Apr. 3, 2014.

(51) Int. Cl.
| | |
|---|---|
| *G06F 3/041* | (2006.01) |
| *B60K 35/00* | (2006.01) |
| *G06F 3/01* | (2006.01) |
| *B60K 37/06* | (2006.01) |
| *G01C 21/36* | (2006.01) |

(52) U.S. Cl.
CPC .............. *B60K 35/00* (2013.01); *B60K 37/06* (2013.01); *G06F 3/017* (2013.01); *B60K 2350/1012* (2013.01); *B60K 2350/1076* (2013.01); *B60K 2350/1096* (2013.01); *G01C 21/36* (2013.01)

(58) Field of Classification Search
CPC   B60K 35/00; B60K 37/06; B60K 2350/1012; B60K 2350/1096; B60K 2350/1076; G06F 3/017; G01C 21/36
See application file for complete search history.

(56) References Cited

U.S. PATENT DOCUMENTS

| | | | |
|---|---|---|---|
| 2005/0276448 A1* | 12/2005 | Pryor | ..................... B60K 35/00 382/103 |
| 2008/0150899 A1 | 6/2008 | Lin | |

(Continued)

FOREIGN PATENT DOCUMENTS

| | | |
|---|---|---|
| DE | 10046904 | 4/2002 |
| DE | 102008018279 | 11/2008 |

(Continued)

*Primary Examiner* — Adam R Giesy
(74) *Attorney, Agent, or Firm* — Staas & Halsey LLP

(57) ABSTRACT

A method controls a climate control system in a motor vehicle. The method involves displaying climate control information on a primary display, determining that a hand is approaching a manual control element for the climate control system, and displaying climate control information on a secondary display while the hand is approaching the manual control element, before the hand touches the manual control element, the secondary display being a multi-use changeable display that, at different times, displays information for different systems of the motor vehicle. The method may therefore provide the information to the occupant of the vehicle when it is needed, before the climate control system is adjusted.

17 Claims, 4 Drawing Sheets

(56) References Cited

U.S. PATENT DOCUMENTS

| | | | |
|---|---|---|---|
| 2009/0267921 A1* | 10/2009 | Pryor | B60K 35/00 345/177 |
| 2011/0141041 A1* | 6/2011 | Parkinson | B60K 35/00 345/173 |
| 2013/0076499 A1 | 3/2013 | Okita | |
| 2014/0229174 A1* | 8/2014 | Graumann | G10L 15/22 704/231 |

FOREIGN PATENT DOCUMENTS

| | | |
|---|---|---|
| DE | 102010011480 | 9/2011 |
| DE | 102010018140 | 10/2011 |

\* cited by examiner

MOTOR VEHICLE AND METHOD FOR CONTROLLING A CLIMATE CONTROL SYSTEM IN A MOTOR VEHICLE

CROSS REFERENCE TO RELATED APPLICATIONS

This application is based on and hereby claims priority to Provisional U.S. Patent Application No. 61/974,727 filed on Apr. 3, 2014, the contents of which are hereby incorporated by reference.

BACKGROUND

The present invention relates to motor vehicles and to a method for controlling a climate control system in a motor vehicle.

Attention has recently focused on vehicle safety problems associated with drivers failing to pay full attention to driving. For example, it is been argued that if a driver attempts to make a phone call or send a text message, the risk of accident is increased. In addition to cell phone use, a driver can also be distracted when it comes time to adjust the climate control system. Particularly in vehicles capable of driving at a high speed, it is important for the driver to focus attention on the road.

To improve attention, it is been proposed to display climate control information as soon as the driver adjusts a climate control manual actuator, to change a temperature setting for example.

SUMMARY

Unfortunately, the information is not presented to the driver until the driver has already changed the setting. For example, the driver must first change the temperature setting before the driver is informed about whether the current temperature is appropriate. Moreover, because the driver is not able to instantaneously read the temperature, the information must remain on the display for a predetermined period of time after the driver has already made the adjustment. This is unnecessary if the driver is no longer interested in the temperature. Moreover, if the information is displayed only in the center console display, there is no guarantee that the driver will see it.

It is known to project information onto the windshield in what is known as a "heads-up display." The heads-up display can be used for different functions. For example, the heads-up display may be used to display a map for a vehicle navigation system. Rather than increase safety, if climate control information were projected onto the driver's windshield in the heads-up display, the lack of the map while the temperature setting is displayed could cause an accident.

One potential goal is to improve safety and overcome the drawbacks of previous proposals.

The inventors propose a method for controlling a climate control system in a motor vehicle. The method involves displaying climate control information on a primary display, determining that a hand is approaching a manual control element for the climate control system, and displaying climate control information on a secondary display while the hand is approaching the manual control element, before the hand touches the manual control element, the secondary display being a multi-use changeable display that, at different times, displays information for different systems of the motor vehicle. The method may therefore provide the information to the occupant of the vehicle when it is needed, before the climate control system is adjusted.

According to one advantageous development, a time-of-flight camera determines when the hand is approaching the manual control element. Time-of-flight cameras have proven to be particularly accurate and are already being installed in some motor vehicles.

In a particularly useful embodiment, the secondary display is a line-of-sight display normally within a driver's line-of-sight when the driver is operating the motor vehicle. A line of sight display might minimize distraction. If the secondary display is a head-up display projected onto a windshield of the motor vehicle or a cluster display, then the driver can get the information as the driver is looking at the road or cluster display, for example. Advantageously, if it is determined that only a passenger's hand is approaching the manual control element, the climate control information is not displayed in the secondary display. This can potentially avoid disturbing the driver if the passenger is trying to make an adjustment.

A further advantage is achieved if the climate control information is selected from the group consisting of temperature setting, fan setting and actual temperature. This may be the information most needed before adjusting the climate control system.

It might be particularly helpful if the climate control information remains displayed in the secondary display while the hand touches the manual control element. During this time, the driver or passenger is thinking about the climate control adjustment. When the hand is removed from the manual control element, the climate control information might remain displayed on the secondary display for a time shorter than a time period that would be required for a driver to understand the climate control information if the climate control information first appeared on the secondary display only after the manual control element was moved. If the driver knows the information in advance, it is not necessary to maintain the information for a long time after the climate control is adjusted. According to one preferred embodiment, the climate control information is removed from the secondary display as soon as the hand is removed from the manual control element. This can minimize distraction. The driver may not care about the climate control information after the adjustment is made.

According to one advantageous option, the primary display is a center console screen, the secondary display is a heads-up display or an instrument cluster display, the method further involves determining a driver's direction of view, and the climate control information is displayed in the primary display only when the driver is looking at the primary display. According to potential embodiments, it may not be necessary to disturb the passenger of the vehicle if the driver can see the information elsewhere. In one possible embodiment, an eye-tracker camera is used to determine the driver's direction of view. Eye-tracker cameras are very effective and are being installed on some new vehicles.

In a particularly useful development, the secondary display displays navigation information for a navigation system of the motor vehicle, and at least a part of the navigation information is excluded from the secondary display when displaying climate control information in the secondary display. The display area is therefore efficiently used without overly distracting the driver.

According to a beneficial option, the manual control element is a rotary or pushbutton controller in a control panel. These types of devices can be intuitively manipulated, without directly viewing them.

Particularly useful is if the climate control information is displayed on the primary display at least when a driver is looking at the primary display. If the driver is looking at the primary display, he/she probably needs this information. Alternatively, the passenger may be making a climate control adjustment.

The inventors also propose a motor vehicle. The motor vehicle has a climate control device with a manual control element, a primary display for climate control information and a secondary display for climate control information, the secondary display being a multi-use changeable display that, at different times, displays information for different systems of the motor vehicle. The motor vehicle also has a gesture recognition device to recognize when a hand is approaching the manual control element of the climate control device and a controller to display climate control information on the secondary display while the hand is approaching the manual control element, before the hand touches the manual control element. All statements with regard to the method can be analogously applied to the motor vehicle

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
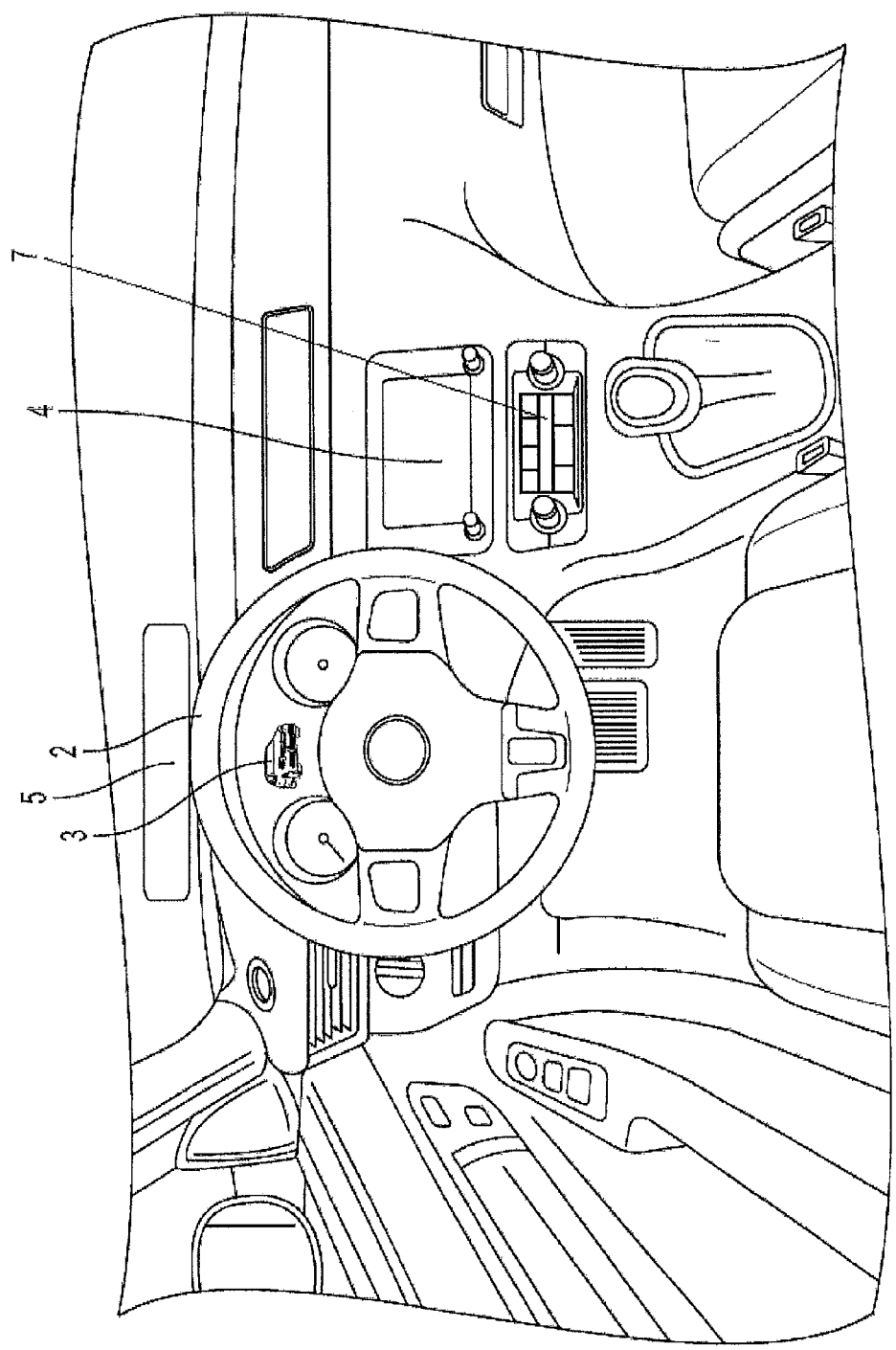
FIG. 1 schematically shows an interior of a motor vehicle.

Reference will now be made in detail to the preferred embodiments of the present invention, examples of which are illustrated in the accompanying drawings, wherein like reference numerals refer to like elements throughout.

The proposed method and device provide a "climate preview," in which the driver/passenger can be provided with information about climate settings when he/she intends to interact with the climate control system, prior to him/her having to actually make the changes to the system. This can be accomplished using gesture recognition to determine when the driver or passenger is reaching for the climate control twist knob (or pushbutton). A time-of-flight camera or other recognition technology can be used for gesture recognition. Upon determining that the driver or passenger is reaching for a climate control device, information about the fan speed and/or temperature is appropriately displayed. This eliminates the need for the driver/passenger to adjust the climate control system before understanding the current state of the climate settings. Also, if the driver is reaching for the climate control device and the information is provided on a display within the driver's line-of-sight, the proposed method and device may allow the driver to maintain focus on driving. Is not necessary for the driver to look down at the knob.

There is a display of the temperature and or other climate settings on the heads-up display or on another display. For example, according to some embodiments, if the driver or passenger looks at the center screen, the driver might see the climate settings there. The driver might also see the settings on the cluster display.

FIG. 1 schematically shows the interior of an automobile, which is one example of a motor vehicle. However, the inventors' proposals are not restricted to automobiles or land motor vehicles and may be applied to boats, aircraft and other types of motor vehicle. Reference numeral 7 represents a system adjustment unit. This could be a climate control adjustment unit.

Figure 2:
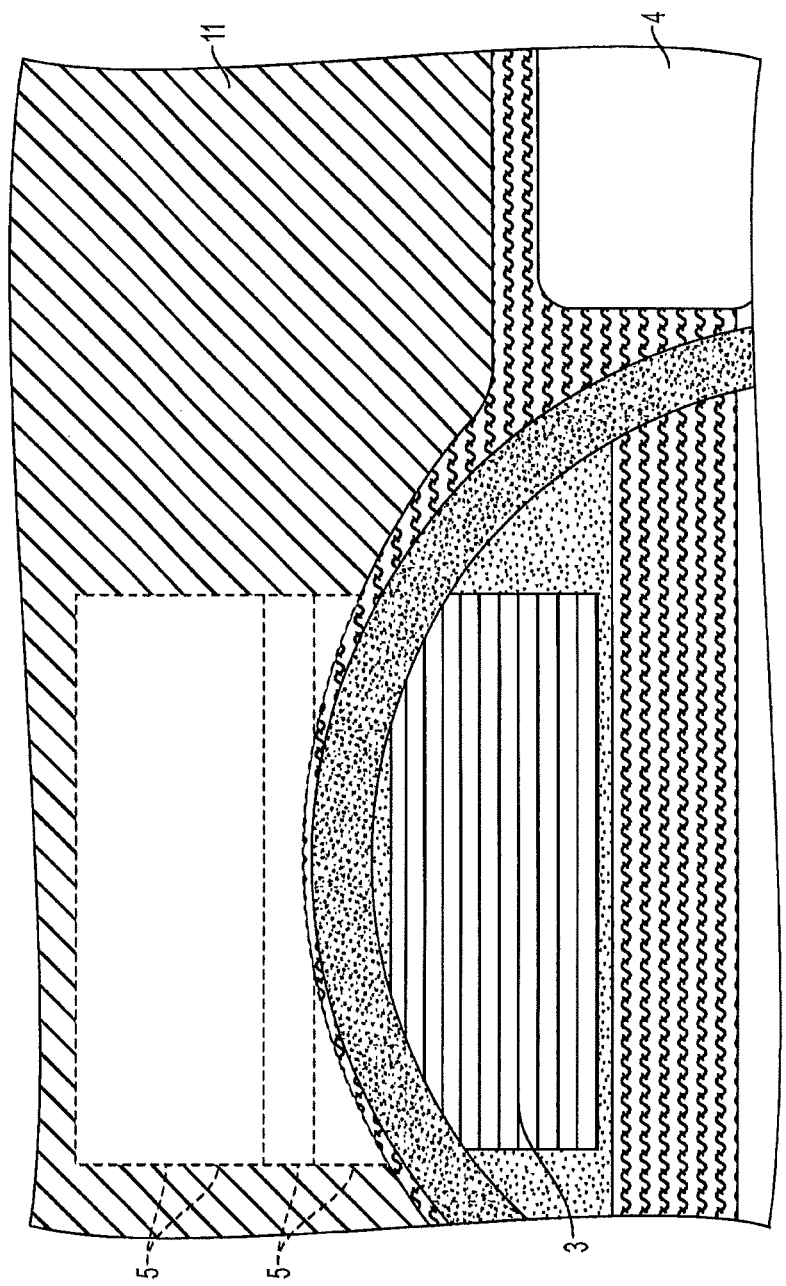
FIG. 2 shows different display possibilities within the motor vehicle.

Reference numeral 4 represents a center console display. As an alternative to unit 7, the climate control adjustments could be completely configured within the center console display 4. Reference numeral 3 represents the multi-component cluster display. A heads-up display 5 is projected onto the windshield in front of the driver. FIG. 2 shows the heads-up display 5 on the windshield II, and the cluster display 3 in more detail.

One important aspect of the inventors' proposals is recognizing when an occupant is reaching for a climate control pushbutton or twist knob, before the passenger has actually touched the device. There are various ways this gesture recognition can be accomplished. One preferred way is using a time-of-flight camera.

Although not restricted to any particular equipment, a time-of-flight camera (ToF camera) may be a range imaging camera system that resolves distance based on the known speed of light, measuring the time-of-flight of a light signal between the camera and the subject for each point of the image. The time-of-flight camera is a class of scannerless LIDAR, in which the entire scene is captured with each laser or light pulse, as opposed to point-by-point with a laser beam such as in scanning LIDAR systems. A time-of-flight camera is able to determine 3D depth and IR grayscale information. It operates with a number of modulated light transmitters (for example three infrared LEDs) and a camera for sensing the light as it reflects off elements in the field of view. The camera is able to measure the time-of-flight of each pixel, allowing it to capture complete 3D information. PMD Technologies™ is one manufacturer of time-of flight cameras.

In addition to time-of-flight cameras, there are other ways to accomplish gesture recognition. For example, radar could be used. Also, a camera could be focused directly in front of the climate control knobs and buttons. Moreover, a capacitive sensor, which usually detects when a surface is contacted, could detect when a person is approaching. An infrared sensor is another example of a device that could be used for gesture recognition.

With the proposals, climate control information is displayed on a "secondary display" when an occupant of the vehicle reaches for a climate control knob or button. This "secondary display" is in addition to the primary display on which the climate control information is ordinarily displayed. For example, if the climate control information is ordinarily displayed in area 7 of the motor vehicle, the climate control information may be displayed in one of the display areas 3, 4, 5.

Figure 4:
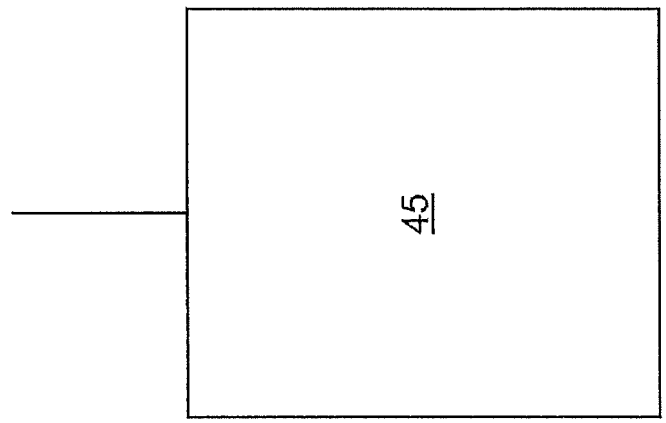
FIG. 4 is a schematic perspective view of an optical head-mounted display.
Figure 4:
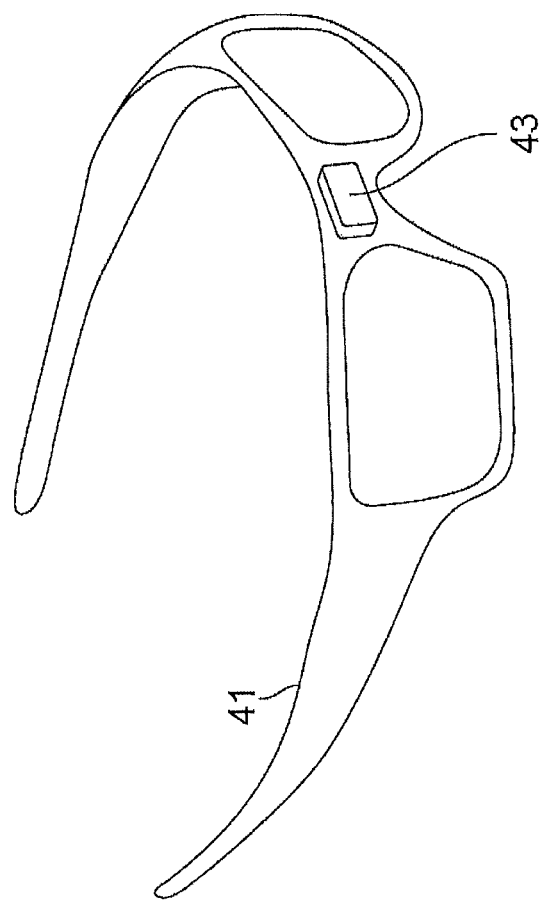

In addition to display areas 3, 4, 5, another example of a secondary display is a wearable optical head-mounted display, such as Google Glass™. FIG. 4 is a schematic perspective view of an optical head-mounted display 41, which displays information in a smartphone-like hands-free format. This display can communicate with the motor vehicle via wireless data transmission, using a wireless transmitter/receiver 43 in the glasses and a wireless transmitter/receiver 45 in the motor vehicle.

The secondary display may be a multiuse display. For example, the center console display 4 may also be used to display navigation or infotainment information. The cluster display 3 may be used to display engine or vehicle information, for example temperatures, pressures or speeds. The heads-up display 5 may be used to display a map, a left or right turn arrow or other navigation information. When the climate control information is displayed on the secondary display, at least a portion of this other information (infotainment information, engine/vehicle information, navigation information) may be removed from the secondary display. To minimize distraction, it is important that the climate control information be displayed only when it is of use.

The secondary display may be a line-of-sight display. Such displays are within the drivers normal line-of-sight when driving the motor vehicle. For example, the heads-up display is on the windshield, where the driver must view the road/water/air. The cluster display is within the driver's line-of-sight when the driver determines various vehicle conditions.

The climate control information can include various data, such as the current temperature setting for the heat or air conditioning, the actual temperature within the car, the fan setting, the fan direction (windshield, center vents, floor), the recirculation mode, etc. Since the display area of the secondary display is restricted and other information may be important, it is preferable to only display the climate control information that is most important. For example, perhaps the temperature setting or fan setting is most important.

The climate control information is displayed when an occupant of the motor vehicle reaches for the knob or pushbutton, before the knob or pushbutton is moved to change a climate control setting. The climate control information is displayed even before the knob or pushbutton is touched. The display remains on the secondary display device just as long as that hand is in the vicinity of the knob. Display of the information may be triggered when the hand is within 30 cm, preferably 20 cm and more preferably 10 cm of the manual actuator. The display remains long enough for the climate control information to be read and understood, but not too long to distract the occupants. For example, the information may remain only for a predetermined time, this predetermined time being shorter than the time that would be required to understand the information if the information first appeared only after the knob of pushbutton was moved. For example, after the actuator is moved (or after the actuator is released) the information remains less than 5 seconds, preferably less than 3 seconds and in particular less than 1 second. In a preferred embodiment, the climate control information may disappear as soon as the knob is released.

Line-of-sight displays, such as the cluster display and the heads-up display, are directly within the driver's line-of-sight. It is therefore important that the information be displayed on a line-of-sight display only when the driver is reaching for the climate control knob or pushbutton. For example, it would not be good to disrupt the driver when the passenger is changing the temperature of the passenger zone of the motor vehicle. For this reason, it is important for the gesture recognition system to also recognize which occupant of the motor vehicle is making the climate control adjustment. The time-of-flight camera mentioned above can be used to detect which occupant of the motor vehicle is making the climate control adjustment. In addition, it is conceivable that another device could check if the adjustment is being made by the driver. For example, a steering wheel touch sensor could detect if the driver has both hands on the steering wheel 2. In this case, it can be concluded that the driver is not reaching for the climate control knob/pushbutton and a line-of-sight display should not be changed.

In a related matter, the secondary display may also be the center console screen. If the driver is able to see the information on the heads-up display, there is no need to distract the passenger by changing the center console screen. For example, if the driver is making the climate adjustment and looking at the heads-up display, the center console display can remain unchanged. In this manner, a passenger watching an entertainment video on the center console, for example, would not be disturbed or aware of the climate control adjustment.

A video-based eye tracker can be used to determine where the driver is looking. The eye tracker can determine if the driver is looking at the center console display. With this technology, a camera focuses on one or both eyes and records their movement as the driver looks at some kind of stimulus. Many eye-trackers use the center of the pupil and infrared/near-infrared non-collimated light to create corneal reflections (CR). The vector between the pupil center and the corneal reflections can be used to compute the point of regard on surface or the gaze direction. Only a simple calibration procedure of the individual driver may be required before the eye tracker can correctly determine the driver's line-of-sight.

Figure 3:
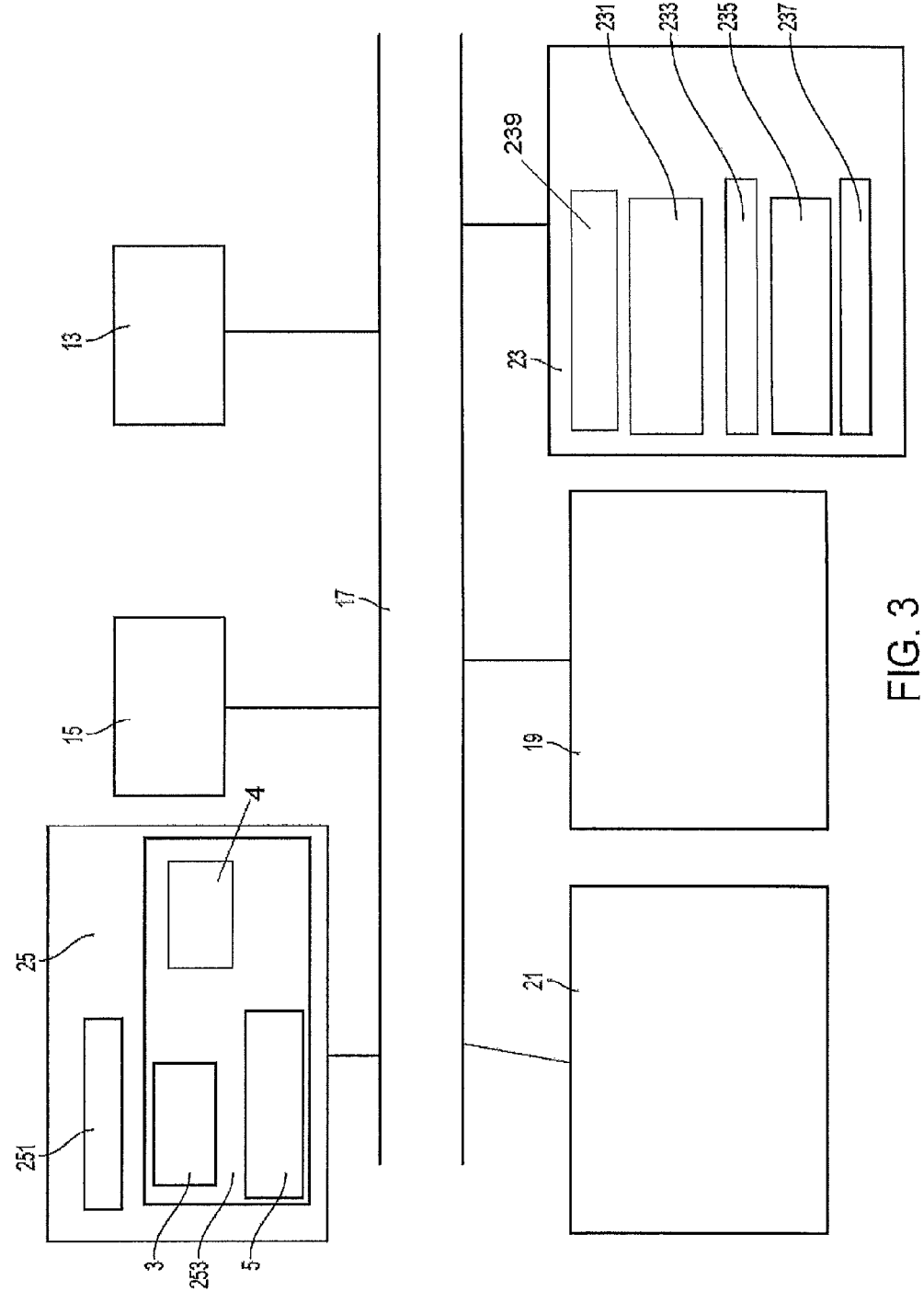
FIG. 3 is a block diagram showing input, output and computing devices for the proposed method and device.

Although the features of the proposals are described separately, the described features, functions, operations, and/or benefits can be freely combined. The word (prefix or suffix article) "a" refers to one or more. The embodiments can be implemented as an apparatus (a machine) that includes hardware for performing the described features, functions, operations, and/or benefits, for example, hardware to execute instructions or software, for example, computing hardware (i.e., computing apparatus), such as (in a non-limiting example) any computer or computer processor that can store, receive, retrieve, process and/or output data and/or communicate (network) with other computers. FIG. 3 is a schematic drawing of possible equipment to implement the proposed features. As illustrated in FIG. 3, the equipment can include a computing controller 15 (CPU) or computing processing system (e.g., one or more processing devices (e.g., chipset(s), including memory 13 or a hardware logic circuitry based computer processor(s) that processes or executes instructions stored in a memory, namely a software/program)), computer readable media 21 (e.g., that stores information objects), a transmission communication interface 19 (wired or wireless data network interface), input devices 23, and/or output devices, which are all coupled (directly or indirectly) to each other, for example, can be in communication with each other through one or more data communication buses 17, such as a CAN bus, FlexRay bus, etc. Examples of input devices 23 include a gesture recognition camera 231, a capacitive sensor 233, the climate control device 235, a steering wheel sensor 237 and an eye tracking camera 239. Examples of output devices 25 include the primary display 251 and the secondary display 253. Examples of the non-transitory computer-readable media include a magnetic recording apparatus, an optical disk, a magneto-optical disk, and/or volatile and/or non-volatile semiconductor memory (for example, RAM, ROM).

An apparatus or device refers to a physical machine that performs operations, for example, a computer (physical computing hardware or machinery) that implements or executes instructions, for example, executes instructions by way of software, which is code executed by computing hardware including a programmable chip (chipset, computer processor, electronic component), and/or implements instructions by way of computing hardware (e.g., in circuitry, electronic components in integrated circuits).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

What is claimed is:

1. A method for controlling a climate control system in a motor vehicle, comprising:
    displaying climate control information on a primary display;
    determining that a hand is approaching a manual control element for the climate control system; and
    displaying climate control information on a secondary display while the hand is approaching the manual control element, before the hand touches the manual control element, the secondary display being a multi-use changeable display that, at different times, displays information for different systems of the motor vehicle, wherein
    the secondary display is a line-of-sight display normally within a driver's line-of-sight when the driver operates the motor vehicle, and
    if it is determined that only a passenger's hand is approaching the manual control element, the climate control information is not displayed on the secondary display.

2. The method according to claim 1, wherein a time-of-flight camera determines when the hand is approaching the manual control element.

3. The method according to claim 1, wherein the secondary display is a head-up display projected onto a windshield of the motor vehicle.

4. The method according to claim 1, wherein the climate control information is selected from the group consisting of temperature setting, fan setting and actual temperature.

5. The method according to claim 1, wherein the climate control information remains displayed in the secondary display while the hand touches the manual control element.

6. The method according to claim 5, wherein the climate control information is removed from the secondary display as soon as the hand is removed from the manual control element.

7. The method according to claim 5, wherein, when the hand is removed from the manual control element, the climate control information remains displayed on the secondary display for a time shorter than a time period that would be required for a driver to understand the climate control information if the climate control information first appeared on the secondary display only after the manual control element was moved.

8. The method according to claim 1, wherein
    the manual control element is a rotary or pushbutton controller in a control panel.

9. The method according to claim 1, wherein
    the climate control information is displayed on the primary display at least when a driver is looking at the primary display.

10. The method according to claim 1, wherein
    the primary display is a center console screen,
    the secondary display is a heads-up display or an instrument cluster display,
    the method further comprises determining a driver's direction of view, and
    the climate control information is displayed in the primary display only when the driver is looking at the primary display.

11. The method according to claim 10, wherein an eye-tracker camera is used to determine the driver's direction of view.

12. The method according to claim 1, wherein
    the secondary display displays navigation information for a navigation system of the motor vehicle, and
    at least a part of the navigation information is excluded from the secondary display when displaying climate control information in the secondary display.

13. A method for controlling a climate control system in a motor vehicle, comprising:
    displaying climate control information on a primary display;
    determining that a hand is approaching a manual control element for the climate control system; and
    displaying climate control information on a secondary display while the hand is approaching the manual control element, before the hand touches the manual control element, the secondary display being a multi-use changeable display that, at different times, displays information for different systems of the motor vehicle, wherein
    the climate control information remains displayed in the secondary display while the hand touches the manual control element, and
    when the hand is removed from the manual control element, the climate control information remains displayed on the secondary display for a time shorter than a time period that would be required for a driver to understand the climate control information if the climate control information first appeared on the secondary display only after the manual control element was moved.

14. A method for controlling a climate control system in a motor vehicle, comprising:
    displaying climate control information on a primary display;
    determining that a hand is approaching a manual control element for the climate control system; and
    displaying climate control information on a secondary display while the hand is approaching the manual control element, before the hand touches the manual control element, the secondary display being a multi-use changeable display that, at different times, displays information for different systems of the motor vehicle, wherein
    the primary display is a center console screen,
    the secondary display is a heads-up display or an instrument cluster display,
    the method further comprises determining a driver's direction of view, and
    the climate control information is displayed in the primary display only when the driver is looking at the primary display.

15. The method according to claim 14, wherein an eye-tracker camera is used to determine the driver's direction of view.

16. A method for controlling a climate control system in a motor vehicle, comprising:

displaying climate control information on a primary display;
determining that a hand is approaching a manual control element for the climate control system; and
displaying climate control information on a secondary display while the hand is approaching the manual control element, before the hand touches the manual control element, the secondary display being a multi-use changeable display that, at different times, displays information for different systems of the motor vehicle, wherein
the secondary display displays navigation information for a navigation system of the motor vehicle, and
at least a part of the navigation information is excluded from the secondary display when displaying climate control information in the secondary display.

17. A motor vehicle comprising:
a climate control device having a manual control element;
a primary display for climate control information;
a secondary display for climate control information, the secondary display being a multi-use changeable display that, at different times, displays information for different systems of the motor vehicle;
a gesture recognition device to recognize when a hand is approaching the manual control element of the climate control device; and
a controller to display climate control information on the secondary display while the hand is approaching the manual control element, before the hand touches the manual control element, wherein
the secondary display is a line-of-sight display normally within a driver's line-of-sight when the driver operates the motor vehicle, and
if it is determined that only a passenger's hand is approaching the manual control element, the climate control information is not displayed on the secondary display.

* * * * *